Reissued Sept. 8, 1931 Re. 18,180

UNITED STATES PATENT OFFICE

MARCEL LÉVY, OF GENEVA, SWITZERLAND, ASSIGNOR, BY MESNE ASSIGNMENTS, TO PRODORITE S. A., OF GENEVA, SWITZERLAND

MANUFACTURE OF CONCRETE

No Drawing. Original No. 1,699,705, dated January 22, 1929, Serial No. 598,651, filed November 2, 1922. Application for reissue filed October 3, 1930. Serial No. 486,277.

Reinforced and non-reinforced concretes hitherto used for the construction of pipe lines, containers for liquids and hydraulic structures of all kinds consist, as is known, of a mixture of pebbles, broken stones, sand and similar filling materials on the one hand and cement, lime, silicates and other mineral salts on the other hand, which are mixed with a definite quantity of water and yield a product that becomes hard after a certain time.

The present invention in brief consists in a method of manufacturing a concrete having mechanical properties similar to cement concrete and retaining these properties under temperature conditions of use which comprises the incorporation under the action of heat of a selected or specially prepared hard pitch with graded filling materials, namely, materials of large size, for example coarse broken stone, fine material, for example powdered stone, and intermediate material, for example sand or gravel.

The improved concrete forming the subject of the present invention possesses considerable and numerous advantages in comparison with the concretes hitherto known, for example it is possible for the first time to produce reinforced and non-reinforced concretes, which in themselves and without the use of any coating can resist the action of chemical substances and in particular acids and even concentrated acids.

Further these concretes can be produced with rather smooth surfaces which are impermeable to water even at a pressure above 15 atmospheres, without the use of any coating.

Concretes produced in this manner are at least as strong as the usual cement concrete.

Three samples each were tested at a temperature of 20° and 60° C. and gave the following results:—

| | Bending stress expressed in kg. per sq. cm. | Crushing stress kg./cm.² |
|---|---|---|
| No. 1 | 65.9 | 420 |
| No. 2 at 20° C. | 73.4 | 400 |
| No. 3 | 69.88 | 390 |
| No. 4 | 62.5 | 387 |
| No. 5 at 60° C. | 70.4 | 391 |
| No. 6 | 66.5 | 407 |

It may be here remarked that the manufacture of compositions with graded or voidless aggregates is well known and the use of pitch as a binder is well known.

Further, pitches of various degrees of hardness are available or have been proposed.

In almost every case, however, for present commercial requirements the pitch to be employed, although it may be hard pitch, is yet as regards the present invention comparatively soft.

I have found it necessary when pitch is to be incorporated as a binding material for the purpose of obtaining the benefit of the present invention to employ a pitch which is harder than the ordinary pitches, such for instance as a pitch which is heated to about 350° C. for driving off the constituents volatile at that temperature. Such a pitch when tested at the maximum temperature of use, say with the Brinell machine with a ball of 20 mm. and a load of 100 kgs., should not give a reading below 10 as the Brinell hardness figure and preferably not less than 15 and its softening point as indicated by a rapid decrease in the Brinell hardness figure should not occur below about 40° C. or some higher temperature according to the use to which the composition is to be put; otherwise a composition having mechanical properties at the temperature of use similar to cement concrete cannot be obtained.

A method of producing such a concrete will now be given by way of example.

In order to produce a cubic metre of concrete, we heat to the melting point for example from 250 to 350 kgs. colophony, sulphur, gum resin or similar products, gas pitch, it being essential that the product used remains very hard at the temperatures to which the concrete may be subjected in use. To the liquid mass are added at about 200° C. 1700 kgs. of broken stone and about 700 kgs. limestone powder and heat applied whilst stirring constantly. The homogeneous mass obtained is cast as for ordinary cement concrete in the hot condition into moulds or shells and sets on cooling and forms a structure of great strength, which may even exceed that of ordinary cement concrete.

The improved concrete may also be produced in another way. For example, coarse grained filling material such as broken stone are first heated to about 200° C. and added to the mixture of the organic binding agent and sand; or the binding agent may first be mixed with the powder and then the coarse grained material added. It is also possible first to heat the broken stone, sand and powder and then to add the pitch in powder form.

It is essential that the binding agent should be quite hard at the temperature to which the concrete is to be subsequently exposed; a result of this is that the softening temperature of the binding agent forms an important factor; as upon this depends the temperature to which the concrete may be heated without losing its strength. For this reason the pitch binding agent, according to the circumstances, may be subjected to a special treatment in order to increase its softening temperature. It is known, for example, that the softening temperature of the various kinds of pitch can be increased by treatment with lime and that of tar distillation products by conducting a current of hot air through the mass at the end of the distillation, the air removing the readily volatile constituents.

It is also known that by treating pitch with hydrochloric or sulphuric acid, the softening temperature of this substance is increased. Pitch may also be subjected to a preliminary treatment in order to purify it and particularly to remove therefrom the soluble substances which it may contain. For this purpose it may be washed with cold or hot water or with cold or hot solutions of mineral acids or soda. In order to render the pitch entirely acid-resistant, it may also be previously treated with concentrated mineral acids and then washed with flowing water, but whatever preliminary treatment be given in the way of washing with water or acids, if the pitch is not hard enough according to the tests given above it must be made sufficiently hard, for example, by heat. A suitable pitch for use in my concrete is gas pitch, mineral oil pitch, or any other pitch of inferior or cheap quality which remains hard in water at 70° C. In order to determine the hardness a sheet 1 mm. thick of this pitch is placed in hot water and heated for some minutes. The sheet should remain quite hard and should not be pliant or scratched by the finger-nail.

Instead of broken limestone all kinds of broken stone, broken bricks or tiles, lava, stoneware, granite, quartz, cork, coke, coal, slag, gravel in fact any solid rubble material and so forth may be used. Broken minerals with sharp edges and rough surfaces give stronger concrete than gravel with smooth surfaces. The limestone powder may also be replaced by other still more finely powdered substances such as clay, stoneware, pumice stone, graphite, coal, soot, kieselguhr, very fine sand and so forth or any other inert powder.

The choice of coarse and fine granular constituents for the new concrete is of great importance.

For instance with hard non-porous limestone in broken up and pulverulent condition 250 kgs. hard gas pitch are required for one cubic metre of concrete, whereas with porous, soft limestone which can be sawn about 400 kgs. are required and with broken pumice stone and pulverized kieselguhr about 500 kgs. of hard gas pitch are necessary. From this it will be seen that the relative proportions of the constituents also depend upon the composition of the mixtures. Care must however be taken that with the coarse granular material sufficient finely powdered substances are mixed in order to obtain a thick pasty mass in which the coarse stones remain in suspension and are uniformly distributed.

In order to prevent contraction of the concrete when setting as much coarse granular and pulverized filling material as possible is used.

The improved concrete according to the present invention must not be confused with the mixtures containing tar which are used for coating roads, pavements or roofs or also for engine foundations. These mixtures necessarily must be more or less soft, plastic and resilient and cannot be used in building constructions in place of ordinary cement concrete for the construction of large containers, water pipes, high pressure pipes (up to 20 atmospheres) dams, dykes, subaqueous structures and so forth.

Asphalt pipes are already in existence which are constructed of cement, iron, glass or wood and then coated either externally or internally with artificial or natural asphalt or asphalt or tar pulp, which are rolled together a number of times, to form a pipe which actually is composed of layers of pulp and asphalt or tar.

These facts assist in bringing out the feature of the present invention still more as here the natural or artificial asphalts, by reason of their presence, do not offer much resistance but are pliable and plastic, so that in an unhardened condition they cannot be used in the manufacture of pipes as they are not sufficiently strong; for this reason it is necessary to reinforce them with wood, cement concrete, glass or pulp. The only kinds of pitch which at present are able to be sold are pitches which are not extremely hard. For this reason pitch which is produced as a hard pitch before it is placed on the market is softened by the addition of oils. The pitch which is required for the present invention as opposed to this softened pitch must be extremely hard.

According to the new process it is possible to obtain pipes, without the necessity of strengthening them, which are stronger than cement pipes and this even at the highest temperatures produced by the heat of the sun.

Hereinafter there is given an example of a pipe which has been produced by means of gas tar the distillation of which has been carried through to a sufficient extent in order to obtain a pitch which is very hard and remains hard at temperatures of 80° C. and over.

With this very hard pitch, which is very brittle and shiny, there is obtained when it is melted and mixed with broken stone, sand and stone powder, a concrete which when cast into pipe moulds, 30 cm. in diameter, 4 cm. thick and 1 meter long, pipes are formed for the fracture of which a load of more than 3500 kgs. is necessary and this at temperatures of 20° and 60° C., the pipe being loaded on its upper part along a length of 50 cm.

For an aged ordinary cement pipe which was cast in the same mould as that which was used for the new concrete, i. e. which had exactly the same dimensions and subjected to loading under the same conditions only 2500 kgs. were necessary to produce the fracture.

From this will at once be seen the importance of the new concrete for the construction of pipe lines of all descriptions as the pipes can be produced at almost the same price as ordinary cement pipes, whilst the pipes of the new concrete are stronger, more resistant against chemical action and at the same time are impermeable to water and possess very smooth surfaces.

There are a number of patents in existence for converting tar containing bituminous substances into artificial asphalt. In all these patents endeavours are made to give these products the properties of asphalts. These must be soft and plastic and therefore vary their hardness in summer and winter in an appreciable manner. To the natural asphaltic earths there is always added a certain quantity of very soft bitumen when the cast, asphalt, is being prepared so that it does not crack in the cold.

Owing to the fact that natural or artificial asphalts are soft and plastic they cannot without hardening be used for the preparation of concrete, for the construction of pipe lines, containers of all kinds and similar structures.

In order to illustrate the above better, experiments were made for the production of concrete for the construction of pipe lines and so forth with different asphalts especially Seyssel asphalt, as used for the production of cast asphalt slabs. These concretes were prepared as follows:—

The asphalt was melted, then mixed with broken stone in order to obtain a thoroughly uniform mixture in which the stones could no longer sink. This concrete is thus similar to that used for the production of road paving. A number of square plates 36 x 12 cm. were produced which were tested as regards bending and pressure. The following are the results obtained by these tests:—

| | Bending stress expressed in kg. per cm.² | Crushing stress kg./cm.² |
|---|---|---|
| No. 31*a* at 20° | 16.7 | 31 |
| No. 31*b* at 40° | 5.7 | 15 |

Further a pipe was constructed from the same asphalt concrete and having a diameter of 30 cm. a length of 1 m. and a thickness of 4 cm.; at a temperature of 25° C. this collapsed under a small load.

Asphalts can be used for the production of the new concrete according to the present invention but they must be previously treated in order that they may be hardened, so that at a temperature to which the concrete may be exposed later they are hard: i. e. the asphalts will no longer possess properties peculiar to asphalts and can no longer be used for coating roads and so forth.

Hard pitch which is suitable for the present invention, cannot replace asphalt as it is too friable, will crack too easily and cannot be used for coating roads.

The presence of coarse gravel, or better of broken stone, plays a very important part in the preparation of the new concrete.

As a general rule it is possible to say that: (1) the more compact the structure of the solid body the smaller will be the quantity of pitch required; (2) the greater the proportion of the solid body in the filling material, the smaller will be the liability of the concrete to crack.

In order to facilitate the combination of an old pitch concrete with a new one the surface of the old concrete may be coated with a varnish or simply with tar or a thin layer of soft asphalt may be poured between the old and the new concrete, whilst the latter is still hot and viscous. This can be done in the following manner:

The new still viscous and soft layer of concrete is separated from the old layer by a trowel and asphalt is poured into the small intervening space. In this manner an effective combination is obtained between the two layers whilst the connecting layer is at the same time also elastic.

The following are a few examples for preparing compositions for particular uses according to the present invention:

*Example for the production of an acid resisting concrete, which will resist the action of concentrated hydrochloric acid.*

500 kgs. of hard pitch which remains hard at about 80° C. are heated to the melting point and mixed, whilst continuously heating and stirring, with 1200 kgs. broken stoneware or pieces of burnt clay or quartz, of which the separate pieces have a thickness of from 1 to 30 mm. as obtained from the stone crusher. In order to prevent these large pieces from sinking in the mass very fine powdered stoneware is added during the continued heating so that the mass becomes thick and pasty and the coarse granular solid constituents remain in suspension. As soon as the mass becomes so thick that the solid constituents no longer separate from the liquid parts it is poured whilst still hot into metal lined wooden shells or moulds in exactly the same manner as when making ordinary cement concrete.

If it is desired to produce reinforced concrete then the iron reinforcements are arranged in the same manner as for ordinary ferro-concrete.

With the new concrete it is possible to construct containers of any desired capacity, pipe lines and the like which will resist the action of acids and especially concentrated hydrochloric acid so that even after being in use for many months they do not show the least signs of decay.

Instead of broken stoneware, lava, pumice stone, quartz and so forth may be used which will resist acids. The powdered stoneware also may be replaced by kieselguhr, pumice stone powder and the like.

The new concrete resists frost and refrigeration as also changes of temperature. A beam constructed of the above concrete 2 m. in length and 10 cm. wide was exposed for some days in a freezing chamber at a temperature of −14° C. after which it was placed in hot water above 40° C., the beam resisted this change of temperature without any injury. A further test was made with a piece of concrete which was completely covered with ice. This piece was then exposed to the action of steam for melting the ice and was not damaged by this treatment.

The new concrete may also be used as a lining for containers of cement concrete. For this purpose a layer of pitch concrete is poured on the cement to a thickness of a few centimeters, so as to cover the whole inner surface of the container. The new concrete adheres very firmly to the cement concrete; a container constructed in this manner was in use for many months without any cracks being observed. This tank was about three feet deep and three feet in diameter. In the case of large containers joints may be employed between sections of the lining by leaving gaps and filling them with a plastic material, for example asphalt.

In order to obtain quite smooth surfaces which are even smoother than those of glazed earthenware and which is of great importance in the case of pipes, the new concrete is poured into previously heated moulds or shells provided with smooth surfaces. In the case of wooden shells or moulds polished wood may be employed or better still wood covered with sheet iron or the like.

The new concrete has nothing in common with tar products which are used for coating or paving roads, pavements or roofs or for engine foundations. These products must usually be comparatively soft and elastic and cannot be used in place of ordinary cement concrete in building construction and for the construction of dams, dykes, large containers, and high pressure water pipes up to 20 atmospheres.

Having now described my invention, what I claim as new and desire to secure by Letters Patent is:—

1. As a new article of manufacture, a pitch concrete having mechanical strength substantially equal to that of cement concrete, comprising a brittle pitch dried so as to remain hard at temperatures of 80° C., said concrete also containing an aggregate and a substantial portion of fine powder sufficient to form a thick pasty mass with the pitch ingredient.

2. A bituminous concrete consisting of a pitch binder which is hard and brittle at ordinary temperature and remains so hard at a temperature of 70° C. that a sheet one millimeter thick is not pliant nor is the binder indentable by the finger nail at such temperature, coating and joining particles of fine mineral powder in quantity at least twice the weight of the binder, and particles of graded aggregate in a quantity of more than twice the weight of the powder.

3. A composition of matter comprising a graded mineral aggregate and containing a substantial proportion of fine mineral powder, to which a tar pitch has been added in a proportion smaller than 18 percent of the composition, which pitch is hard and brittle at ordinary temperatures and when placed in water at 70° C. in a sheet one millimeter thick remains hard and is not pliant nor can it be indentable by the finger nail, the quantity of powder being substantially greater than that of pitch, and the quantity of aggregate being substantially greater than that of powder, so that the composition has a resistance to crushing stress not less than that of cement concrete over a temperature range up to 60° C.

4. A composition of matter comprising an aggregate and fine mineral powder substantially filling the voids of the aggregate, and a tar pitch binder which is hard and brittle at ordinary temperatures and retains its hardness to a temperature of 70° C. but is molten at a temperature of approximately 200° C., the binder being present in a quantity of approximately ten percent of the combined aggregate and powder, said composition at temperatures between 20° and 60° C. having a resistance to crushing stress of substantially 387 kilograms per square centimeter.

In testimony whereof I have signed my name to this specification.

MARCEL LÉVY.